Sept. 23, 1958 W. B. BROWN 2,853,588
WORKPIECE HANDLING APPARATUS
Filed May 17, 1957 2 Sheets-Sheet 1

WITNESSES:
Bernard R. Gieguey
Benjamin DeWitt

INVENTOR
William B. Brown
BY T. W. Murray
ATTORNEY

Sept. 23, 1958 W. B. BROWN 2,853,588
WORKPIECE HANDLING APPARATUS
Filed May 17, 1957 2 Sheets-Sheet 2
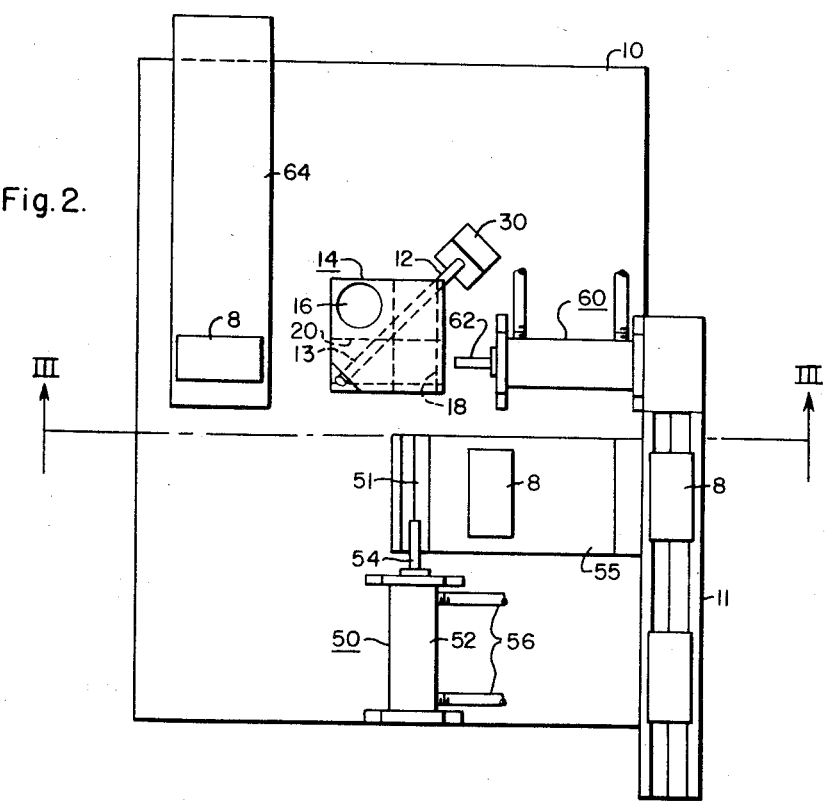
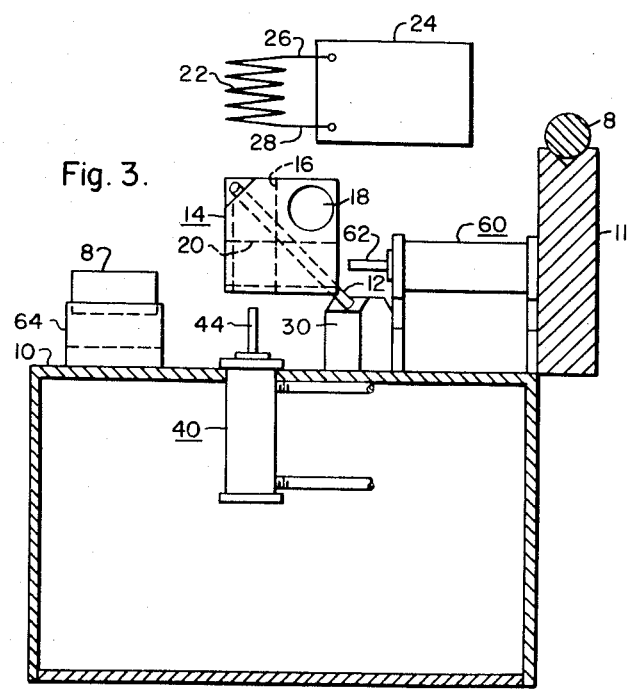

United States Patent Office 2,853,588
Patented Sept. 23, 1958

2,853,588

WORKPIECE HANDLING APPARATUS

William B. Brown, Pasadena, Md., assignor to Westinghouse Electric Corporation, East Pittsburgh, Pa., a corporation of Pennsylvania Application May 17, 1957, Serial No. 659,892

10 Claims. (Cl. 219—10.69)

This invention relates to workpiece handling apparatus and more particularly to supporting and positioning apparatus for manipulating workpieces to be processed.

In the industrial arts it is frequently desirable to rapidly manipulate large and massive workpieces in order to perform complex operations such as induction heating or forging or the like in a time period of a few seconds per workpiece. For example, in the manufacture of 8-inch diameter artillery shells, high frequency induction heating by a continuous process has been found advantageous as a means of annealing the unfinished shell casings. Because of the high temperature, large size and mass of such articles, considerable difficulty is encountered in providing a rapid, orderly and consistent flow of workpieces to and away from the automatic induction heating apparatus.

Accordingly, it is an object of this invention to provide a simple and low cost apparatus for conveying, positioning and supporting of successive workpieces for the performance of a manufacturing process thereon.

It is another object to provide apparatus for rapid and efficient mass production induction heating of large workpieces.

It is a further object to provide automatic handling apparatus which is operative to convey workpieces from a delivery position to a workpiece processing position, to remove the workpiece from the processing position when treatment is completed and to thereafter convey the workpiece to a discharge position.

It is an additional object to provide a workpiece handling apparatus for the purposes described in which a rotary turret is operative to receive unprocessed workpieces at a first position, to accurately situate a workpiece at a second position for processing and to thereafter convey the workpiece to a discharge position.

It is a different object to provide workpiece handling apparatus in which a rotary turret is operative to rotatively support a plurality of workpieces so that a second workpiece may be received at a first position during the interval in which a first workpiece is being processed at a second position.

The foregoing and other objects of this invention will be apparent from the following description taken in accordance with the accompanying drawings throughout which like reference characters indicate like parts, which drawings form a part of this application and in which:

Fig. 2 is a plan view partly broken away of the apparatus shown in Fig. 1; and

Fig. 3 is a vertical sectional view taken along the lines III—III of Fig. 2.

Figure 1:
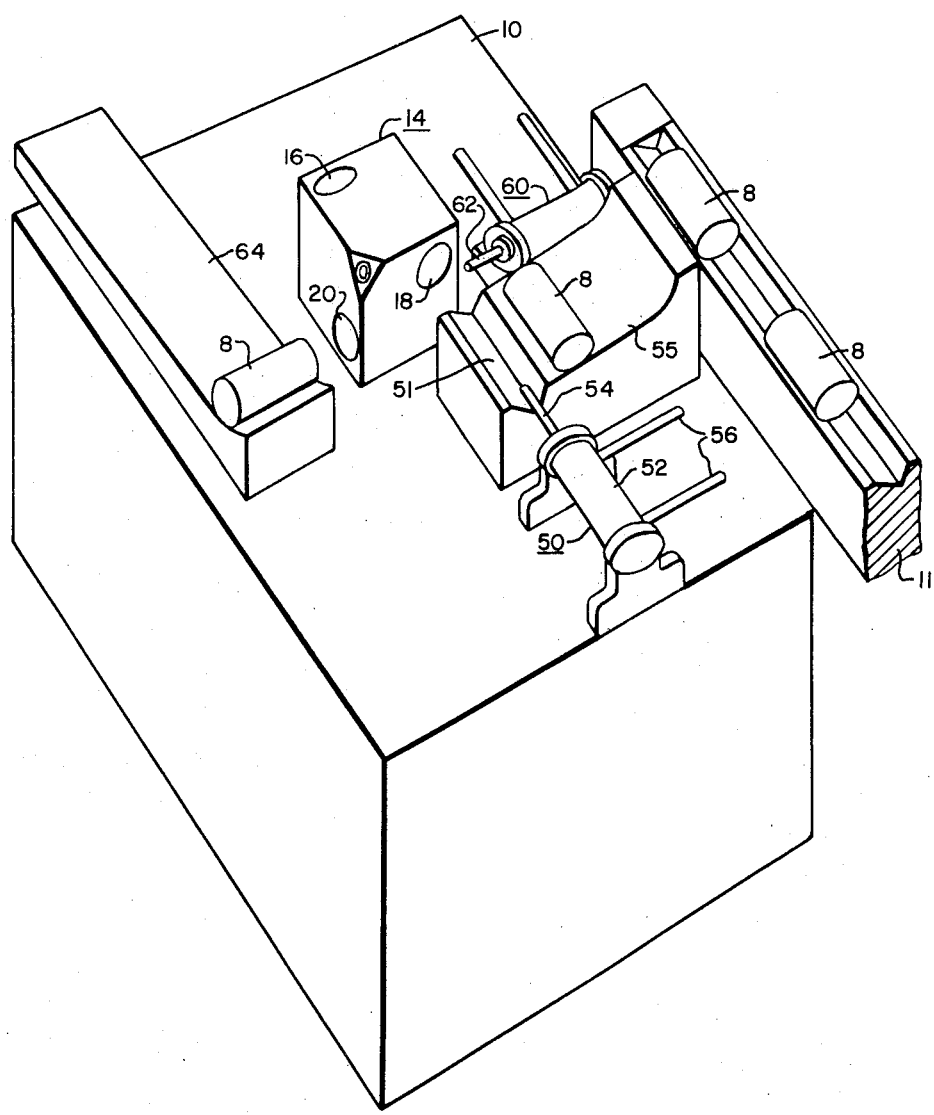
Figure 1 is a perspective view of the workpiece handling apparatus embodying the invention.

Referring now to the drawings in detail, there is shown in Fig. 1 a table or base 10 for supporting the workpiece handling apparatus of the invention. Adjacent one side of the table 10 there is provided an in-feed trackway 11 for delivering workpieces 8 to the handling apparatus. Adjacent the end of the conveyor trackway 11 and at right angles thereto there is provided an in-feed mechanism including an inclined chute 55 along which workpieces may slide or roll from the conveyor trackway 11 to a loading position near the center of the table 10. A workpiece 8, after sliding or rolling along the chute 55, falls upon a V-shaped feed trough 51 which supports the workpiece in the loading position in alignment with a reciprocating loading device 50 adapted to axially shift the workpiece 8 from the V-shaped feed trough 51 into a tubular support member 18. The loading device 50 includes a cylinder 52 having a piston and a pusher rod 54 aligned with the V-shaped feed trough 51 and further includes appropriate conduit means 56 for conducting compressed air or other actuating fluid to the cylinder at selected times.

For convenience in describing the relative positions of the various parts of the apparatus, it will be herein thought of as standing in an upright position with workpiece processing means 22 being supported above the turret 14 with the workpiece pathway from the turret 14 to the workpiece processing means 22 being vertically aligned as shown in Fig. 3; however, it is to be understood that in actual practice the turret 14 and the workpiece processing means 22 may be otherwise oriented so that the workpiece pathway from the turret 14 to the processing means 22 may be horizontal or in an inclined position.

The workpiece supporting and positioning mechanism, in the preferred embodiment, comprises a turret 14 which is shown as a rectangular hexahedron or cube with a plurality of openings 16, 18 and 20 extending therethrough perpendicularly to the respective surfaces of the cube with the longitudinal axis of one of the openings 16 being perpendicular to the axis of a second opening 18 and likewise perpendicular to the longitudinal axis of a third opening 20. The turret 14 is rotatably supported on an inclined rotatable shaft 12 as best shown in Figs. 2 and 3. The axis of rotation of the turret 14 and hence the shaft 12 extends through the rectangular turret 14 diagonally between opposite corners of the turret, and the shaft 12 is supported from the table 10 by a support member 30 which may include appropriate journals for supporting the shaft 12 with the shaft 12 conveniently extending below the table top 10 to an indexing mechanism and a driving motor means (not shown), which is operative to periodically rotate the shaft 12 through a preselected angular rotation. In the particular embodiment shown in which the turret 14 includes three workpiece support members 16, 18 and 20, the indexing mechanism is operative to periodically rotate the turret through successive angles of 120° about the axis of rotation 12. The turret 14 is not a solid metal cube, but is preferably a hollow box-like structure formed of rectangular metal plates positioned perpendicularly to each other and welded together at their edges. In the preferred structure the openings 16, 18 and 20 are enclosed by tubular workpiece support members formed of sections of cylindrical metal tubing which extend perpendicularly between aligned apertures in opposite surfaces of the box 14 and are secured to and supported by the side walls of the box with the respective ends of each tubular member being peripherally welded to the side walls of the box.

As best shown in Fig. 3, a second pusher device 40, mechanically similar to the loading device 50, comprising piston and cylinder parts and a pusher rod 44 is mounted beneath the table top 10 in vertical alignment with the workpiece support member 16. The workpiece processing means 22 which may be a high frequency induction heating furnace coil is supported above the turret 14 in vertical axial alignment with the pusher device 40 and in alignment with the workpiece support member 16. The vertically aligned axis of the induction heating coil 22 is spaced horizontally from the vertical plane of the axis of rotation 12 of the turret 14. The spacing between the axis of rotation 12 and the axis of the induction coil 22 is such that as the turret 14 rotates, each of the work-piece support members 16, 18 and 20 will successively be positioned in axial alignment below the induction heating coil 22. The hollow interior of the induction heating coil 22 is of such dimension that when workpieces are elevated by the pusher device 40 the workpiece will move upward from the vertically aligned support member 16 and will freely enter into the interior of the induction heating coil 20 and will have a current induced therein to heat the workpiece to a predetermined desired temperature. The induction heating coil 22 is electrically connected to a source of high frequency current 24 by means of a pair of leads 26 and 28 each having one end connected to the coil 22 and their opposite ends secured to the terminals of the high frequency source 24. A more complete disclosure herein of the high frequency induction heating coil 22 and the source of high frequency current is not believed necessary to a complete understanding of the present invention.

As best shown in Figs. 2 and 3, a discharge mechanism is provided including a third pusher device 60 horizontally aligned above the surface of the table 10 in axial alignment with the workpiece support member 20 of the turret 14. The discharge pusher device 60 may be similar to the in-feed pusher device 50 and the elevator pusher device 40 and may conveniently comprise piston and cylinder parts and a pusher rod 62 is operative to reciprocate horizontally to push a workpiece 8 located in the workpiece support member 20 axially out of the turret. Located at the left of the turret 14 as seen in Figs. 2 and 3 there is provided a discharge ramp 64 onto which workpieces discharged from the turret 14 fall and subsequently roll or slide from the table 10.

In operation, a procession of workpieces 8 are successively delivered to the apparatus of the present invention from an external source as for example from a workpiece extrusion press. The workpieces move along the in-feed conveyor 11 to the delivery chute 55 and thence to the V-shaped feed trough 51 in alignment with the loading mechanism pusher device 52. The pusher device 52 is actuated to axially shift a first workpiece 8 from the V-shaped feed trough into the first workpiece support member 18. The indexing mechanism is then actuated to rotate the turret 14 through an angle of 120° thereby vertically positioning the first workpiece in alignment with the induction heating coil 22. When the first support member 18 has been positioned vertically in alignment with the coil 22, the second workpiece support member 20 will be horizontally aligned with the V-shaped trough 51 and the loading mechanism 50. The pusher device 52 is then actuated to shift a second workpiece into the support member 20. Simultaneously, the elevator pusher device 40 is actuated to axially shift the first workpiece 8 from the support member 18 along a vertical axis into the heating coil 22. When a predetermined temperature of the workpiece 8 is reached, the elevator pusher device 40 is again actuated to retract the elevator pusher rod 44 thereby permitting the heated workpiece to descend from the induction coil 22 into the workpiece support member 18. As soon as the elevator pusher rod 44 retracts sufficiently to clear the turret 14, the indexing mechanism 30 is again actuated to rotate the turret about its inclined axis of rotation 13 through an angle of 120°. The second workpiece supported in workpiece support member 20 is thereby vertically aligned with the induction heating coil 22. The third workpiece support member 16 is aligned with the V-shaped trough 51 and with the in-feed pusher device 52. The first workpiece support member 18 has traversed 240° of rotation and is now horizontally aligned in the discharge position in alignment with the discharge pusher device 60. While a third workpiece is being shifted into the third workpiece support member 16 by the in-feed pusher device 52, the second workpiece is being elevated into the heating coil 22 and the first workpiece is being horizontally shifted out of the horizontally aligned first support member 18 and onto the discharge ramp 64. Thus it is seen that the workpiece handling apparatus of the present invention is operative to convey a succession of workpieces from the V-shaped delivery through 51 to a workpiece processing position within the induction heating coil 22 and to thereafter convey the workpiece to a discharge position on the discharge ramp 64.

While the present invention has been shown in one form only, it will be obvious to those skilled in the art that it is not so limited but is susceptible of various changes and modifications without departing from the spirit and scope thereof. For example, while the turret 14 has been shown as being substantially (cubical) and having only three workpiece support members 16, 18 and 20, it is to be understood that the turret may be provided with additional workpiece support members or openings in multiples of three with the indexing mechanism being adapted to rotate the turret through an angle corresponding to the angle between adjacent workpiece support members.

I claim as my invention:

1. In an apparatus for intermittently conveying articles to be heated to an induction heating coil, a rotatable article supporting turret having an axis of rotation, a plurality of article receiving support members carried by said turret and spaced radially from said axis for rotation thereabout, with each of said members having a longitudinal axis substantially perpendicular to the axis of another of said members, means for intermittently indexing said turret to successively shift articles supported by said members from a first position to a second position in axial alignment with the heating coil, and reciprocating means to carry an article aligned with the coil into operative relation with respect to the coil.

2. In apparatus for intermittently conveying articles to be heated to an induction heating coil, a support base provided with an inclined shaft, a turret mounted for rotation about the axis of said shaft, the heating coil being positioned above said turret with the axis of the coil being substantially vertical and spaced from the vertical plane defined by the axis of said shaft, a plurality of article support members each having a longitudinal axis mounted on said turret and equally spaced from said shaft with the longitudinal axis of each of said members being substantially perpendicular to the axis of another of said members, means for intermittently indexing said turret to successively shift said members from a first position to a substantially vertical second position in axial alignment with the heating coil, reciprocating elevator means positioned below said turret in axial alignment with said coil to carry an article from said second position into heating relation with respect to the coil, and loading means including a reciprocating pusher member aligned with said first position to axially shift an article to be heated into said first position.

3. Handling apparatus for workpieces to be processed comprising a plurality of workpiece support members each having a longitudinal axis, a turret connecting said support members together to maintain them substantially perpendicular to each other and having an axis of rotation with said support members being equally spaced from said axis, means for intermittently indexing said turret about said axis of rotation to successively shift each of said workpiece support members from a first position to a second position, workpiece processing means positioned adjacent said turret and axially aligned with said second position, means for reciprocally shifting a workpiece from said second position into operative relation to said workpiece processing means, and loading means including a reciprocating pusher member aligned with said first position to axially shift workpieces to be processed into engagement with workpiece support members situated in said first position.

4. In apparatus for manipulating workpieces to be processed, a turret mounted for rotation about an inclined axis, a plurality of workpiece support members each having a longitudinal axis mounted on said turret in equally spaced relation to said inclined axis, with the longitudinal axis of each of said members being substantially perpendicular to the axis of another of said members and disposed at a predetermined angle to said inclined axis, means for intermittently indexing said turret to rotatably shift said members from a first position to a second position, workpiece processing means disposed adjacent said turret in alignment with said second position, reciprocating means disposed in operative alignment with said second position to reciprocally carry a workpiece from said second position into operative relation with the workpiece processing means, and loading means including a reciprocating member disposed adjacent said turret in alignment with said first position to periodically shift a workpiece to a support member situated in said first position.

5. In apparatus for manipulating workpieces to be processed, a turret mounted for rotation about an inclined axis, a plurality of workpiece support members each having a longitudinal axis mounted on said turret in equally spaced relation to said inclined axis, with the longitudinal axis of each of said members being substantially perpendicular to the axis of another of said members and disposed at a predetermined angle to said inclined axis, means for intermittently indexing said turret to rotatably shift said members from a first position in which the longitudinal axis of the support member is substantially horizontal to a second position in which the said longitudinal axis is substantially vertical, workpiece processing means disposed adjacent said turret in alignment with said second position, reciprocating means disposed in operative alignment with said second position to reciprocally carry a workpiece from said second position into operative relation with the workpiece processing means, and loading means including a reciprocating member disposed adjacent said turret in alignment with said first position to periodically shift a workpiece to a support member situated in said first position.

6. In apparatus for manipulating workpieces to be processed, a turret mounted for rotation about an inclined axis, a plurality of workpiece support members each having a longitudinal axis mounted on said turret in equally spaced relation to said inclined axis, with the longitudinal axis of each of said members being substantially perpendicular to the axis of another of said members and disposed at a predetermined angle to said inclined axis, means for intermittently indexing said turret to rotatably shift said members from a first position to a second position, workpiece processing means comprising a tubular induction heating coil positioned above said turret in axial alignment with said second position and with the vertical axis of the coil spaced from the vertical plane defined by said inclined axis, reciprocating means disposed in operative alignment with said second position to reciprocally carry a workpiece from said second position into operative relation with the induction heating coil, and loading means including a reciprocating member disposed adjacent said turret in alignment with said first position to periodically shift a workpiece to a support member situated in said first position.

7. In apparatus for manipulating workpieces to be processed, a turret comprising a substantially rectangular hexahedron mounted for rotation about an inclined axis including opposite corners of the hexahedron, a plurality of tubular workpiece support members each having a longitudinal axis mounted on said turret in equally spaced relation to said inclined axis, with the longitudinal axis of each of said members being substantially perpendicular to the axes of the other members and disposed at a predetermined angle to said inclined axis, means for intermittently indexing said turret to rotatably shift said members from a first position to a second position, workpiece processing means disposed adjacent said turret in alignment with said second position, reciprocating means disposed in operative alignment with said second position to reciprocally carry a workpiece from said second position into operative relation with the workpiece processing means, and loading means including a reciprocating member disposed adjacent said turret in alignment with said first position to periodically shift a workpiece to a support member situated in said first position.

8. In apparatus for manipulating workpieces to be processed, a turret mounted for rotation about an inclined axis, a plurality of workpiece support members each having a longitudinal axis mounted on said turret in equally spaced relation to said inclined axis, with the longitudinal axis of each of said members being substantially perpendicular to the axis of another of said members and disposed at a predetermined angle to said inclined axis, means for intermittently indexing said turret to successively position each of said support members at first, second and third peripherally spaced positions, said predetermined angle being such that the axis of each support member is substantially horizontal at said first and third positions and is vertical at said second position, workpiece processing means disposed adjacent said turret in alignment with said second position, reciprocating means disposed in operative alignment with said second position to reciprocally carry a workpiece from said second position into operative relation with the workpiece processing means, and loading means including a reciprocating member disposed adjacent said turret in alignment with said first position to periodically shift a workpiece to a support member situated in said first position.

9. In combination, a rotatable workpiece supporting turret having an axis of rotation, at least three workpiece receiving supports carried by said turret and spaced radially from said axis for rotation thereabout, each of said supports having a longitudinal axis substantially perpendicular to the longitudinal axis of each of said other supports, and means for rotating said turret about its axis to move workpieces carried by said supports from a loading station to an unloading station.

10. In combination, a rectangular hexahedron rotatable about an axis extending from one corner of the hexahedron to the diametrically opposite corner, a first article receiving passage extending between a first pair of opposed sides of the hexahedron, a second article receiving passage extending between a second pair of opposed sides of the hexahedron, a third article receiving passage extending between the remaining pair of opposed sides of the hexahedron, and means for rotating the hexahedron about its axis whereby successive ones of said passages are moved from a loading station where articles are inserted into said passages to an unloading station where articles are discharged from the passages.

References Cited in the file of this patent

UNITED STATES PATENTS

| | | |
|---|---|---|
| 1,924,383 | Stampfli | Aug. 29, 1933 |
| 2,685,122 | Berthiez | Aug. 3, 1954 |
| 2,803,872 | Massa | Aug. 27, 1957 |